(12) United States Patent
Izumi et al.

(10) Patent No.: US 10,565,343 B2
(45) Date of Patent: Feb. 18, 2020

(54) CIRCUIT CONFIGURATION OPTIMIZATION APPARATUS AND MACHINE LEARNING DEVICE

(71) Applicant: FANUC Corporation, Yamanashi (JP)

(72) Inventors: Hitoshi Izumi, Yamanashi (JP); Kenichiro Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 38 days.

(21) Appl. No.: 15/947,835

(22) Filed: Apr. 8, 2018

(65) Prior Publication Data

US 2018/0300442 A1  Oct. 18, 2018

(30) Foreign Application Priority Data

Apr. 13, 2017 (JP) .................. 2017-079851

(51) Int. Cl.
*G06F 17/50* (2006.01)
*G06N 20/00* (2019.01)
*G06N 3/02* (2006.01)

(52) U.S. Cl.
CPC ........ *G06F 17/5072* (2013.01); *G06F 17/505* (2013.01); *G06F 17/5081* (2013.01); *G06N 20/00* (2019.01); *G06N 3/02* (2013.01)

(58) Field of Classification Search
USPC ....................................................... 716/119
See application file for complete search history.

(56) References Cited

U.S. PATENT DOCUMENTS

| 5,655,069 | A | 8/1997 | Ogawara et al. |
| 2007/0011578 | A1 | 1/2007 | Lewis et al. |
| 2015/0100608 | A1 | 4/2015 | Varadarajan et al. |
| 2015/0161323 | A1 | 6/2015 | Frischke |
| 2016/0266964 | A1 | 9/2016 | Uekusa |
| 2018/0260687 | A1* | 9/2018 | Kanno ................. G06N 3/0454 |

FOREIGN PATENT DOCUMENTS

| JP | H8-44581 A | 2/1996 |
| JP | 2005-243937 A | 9/2005 |
| JP | 2006-344223 A | 12/2006 |
| JP | 2014-134842 A | 7/2014 |
| JP | 2016-167669 A | 9/2016 |

OTHER PUBLICATIONS

Office Action in JP Application No. 2017-079851, dated Dec. 11, 2018, 8pp.

* cited by examiner

*Primary Examiner* — Bryce M Aisaka
(74) *Attorney, Agent, or Firm* — Hauptman Ham, LLP (57) ABSTRACT

A circuit configuration optimization apparatus includes a machine learning device that learns a circuit configuration of a FPGA device. The machine learning device observes circuit configuration data of the FPGA device and FPGA error occurrence state data indicating an error occurrence state of the FPGA device as state variables that express a current state of an environment. In addition, the machine learning device acquires determination data indicating propriety determination results of an operating state of the FPGA device. Then, the machine learning device learns the circuit configuration of the FPGA device in association with the FPGA error occurrence state data, using the state variables and the determination data.

8 Claims, 7 Drawing Sheets

CIRCUIT CONFIGURATION OPTIMIZATION APPARATUS AND MACHINE LEARNING DEVICE

RELATED APPLICATIONS

The present application claims priority to Japanese Application Number 2017-079851, filed on Apr. 13, 2017, the disclosure of which is hereby incorporated by reference herein in its entirety.

BACKGROUND OF THE INVENTION

1. Field of the Invention

The present invention relates to a circuit configuration optimization apparatus and a machine learning device.

2. Description of the Related Art

Although, in standard integrated circuits, all the circuits are fixed at the time of manufacture, there are programmable logic devices (PLDs) that allow user to set desired circuit configurations to function after shipment. Examples of such devices include field programmable gate array (FPGA) devices, which may be used by configuring, as necessary, circuits including simple logic circuits and complicated circuits having a memory element at sites where the FPGA devices are used, by combining logic blocks, which are programmable logic components. In the FPGA devices, such circuits may be structured at any position on packages.

When entering a FPGA device, a neutron beam collides with boron or the like in a package to cause the occurrence of a large amount of ions containing α-rays and a potential inside silicon is reversed due to the α-rays. As a result, a soft error occurs. Note that as a related art concerning a soft error in a FPGA device, Japanese Patent Application Laid-open No. 2006-344223 and Japanese Patent Application Laid-open No. 2016-167669 disclose a technology for detecting the occurrence of a soft error.

Figure 9:
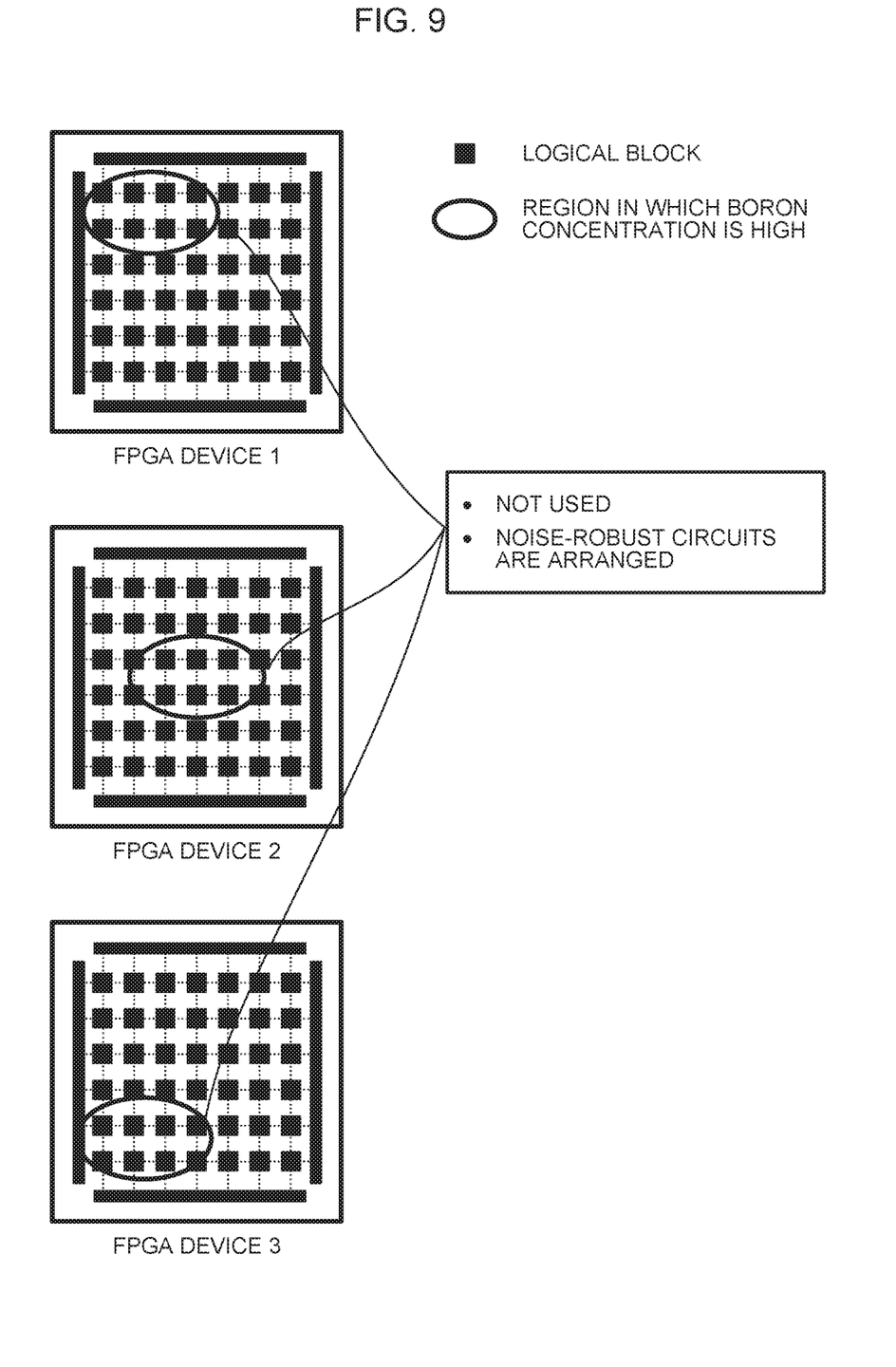
FIG. 9 is a schematic structural diagram of FPGA devices.

The occurrence frequency of a soft error in a FPGA device changes depending on the density of boron (the degree of boron concentration) or the like contained in a packaging material constituting the FPGA device. FIG. 9 shows the schematic structural diagrams of FPGA devices.

When the FPGA devices have a region in which boron concentration is high as shown in FIG. 9, it is highly likely that a soft error occurs in the region. Therefore, countermeasures against the soft error are taken in such a way that circuits are not arranged in the region or noise-robust circuits having an error correcting function or redundancy are arranged.

As described above, a FPGA logic circuit region having a high occurrence frequency of a soft error is different for each FPGA device, but it is necessary to understand the position of a FPGA device at which the soft error easily occurs in order to efficiently take countermeasures against the soft error.

SUMMARY OF THE INVENTION

In view of the above problem, the present invention has an object of providing a circuit configuration optimization apparatus and a machine learning device capable of reducing an occurrence frequency of the malfunction of a FPGA device.

A circuit configuration optimization apparatus according to the present invention stores an occurrence frequency of a soft error in a FPGA device in association with a position on the FPGA device, collects the stored occurrence frequency of the soft error and data relating to the error occurrence state of the FPGA device including processing speed, a heating value, power consumption, or the like of the FPGA device, and performs machine learning using the collected occurrence frequency and the data as state data. As a result, the circuit configuration optimization apparatus is allowed to derive an optimum circuit configuration by which the secured operation of the FPGA device is obtained.

A circuit configuration optimization apparatus according to an embodiment of the present invention optimizes a circuit configuration and an arrangement of a FPGA device. The circuit configuration optimization apparatus includes a machine learning device that learns the circuit configuration of the FPGA device. The machine learning device includes a state observation section that observes, as state variables that express a current state of an environment, circuit configuration data of the FPGA device indicating the circuit configuration of the FPGA device, and FPGA error occurrence state data indicating an error occurrence state of the FPGA device, a determination data acquisition section that acquires determination data indicating a propriety determination result of an operating state of the FPGA device, and a learning section that learns the circuit configuration of the FPGA device in association with the FPGA error occurrence state data, using the state variables and the determination data.

The state observation section may further observe FPGA device operating state data containing, as the state variable, at least any of a heating value, power consumption, and operating speed of the FPGA device, and the learning section may learn the circuit configuration of the FPGA device in association with both the FPGA error occurrence state data and the FPGA device operating state data.

The learning section may include a reward calculation section that calculates a reward relating to the propriety determination result, and a value function update section that updates, using the reward, a function that expresses values of the circuit configuration of the FPGA device for the error occurrence state of the FPGA device.

The learning section may calculate the state variables and the determination data in a multilayer structure.

The circuit configuration optimization apparatus may further include a decision-making section that outputs a command value based on the circuit configuration of the FPGA device, according to learning results of the learning section.

The learning section may learn the circuit configuration of the FPGA device in each of a plurality of industrial machines, using the state variables and the determination data obtained for each of the plurality of industrial machines.

The machine learning device may exist in a cloud server.

A machine learning device according to another embodiment of the present invention learns a circuit configuration of a FPGA device. The machine learning device includes: a state observation section that observes, as state variables that express a current state of an environment, circuit configuration data of the FPGA device indicating the circuit configuration of the FPGA device, and FPGA error occurrence state data indicating an error occurrence state of the FPGA device; a determination data acquisition section that acquires determination data indicating propriety determination results of an operating state of the FPGA device; and a learning section that learns the circuit configuration of the FPGA device in association with the FPGA error occurrence state data, using the state variables and the determination data.

According to an embodiment of the present invention, it is possible to reduce a malfunction frequency of a FPGA device and improve the operating ratio of an apparatus in which the FPGA device is installed by the determination of the circuit configuration of the FPGA device based on learning results.

DETAILED DESCRIPTION OF THE PREFERRED EMBODIMENTS

Figure 1:
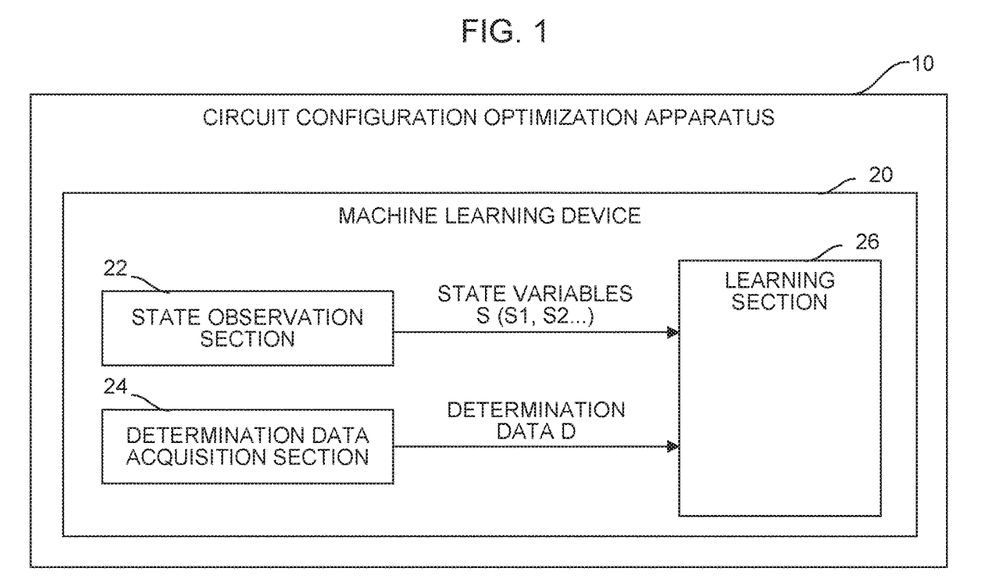
FIG. 1 is a schematic function block diagram of a circuit configuration optimization apparatus according to a first embodiment of the present invention.

FIG. 1 is a schematic function block diagram of a circuit configuration optimization apparatus 10 according to a first embodiment.

The circuit configuration optimization apparatus 10 may be mounted as, for example, a part of a system (not shown) for reconfiguring a field programmable gate array (FPGA) device installed in a machine (not shown). The circuit configuration optimization apparatus 10 includes a machine learning device 20 having software (such as a learning algorithm) and hardware (such as the CPU of a computer) for spontaneously learning circuit configuration optimum values of circuits arranged in the FPGA device through so-called machine learning. The circuit configuration optimum values learned by the machine learning device 20 of the circuit configuration optimization apparatus 10 correspond to a model structure expressing the correlation between information relating to the error occurrence state of the FPGA device and the circuit configuration of the FPGA device.

As shown in the function block of FIG. 1, the machine learning device 20 of the circuit configuration optimization apparatus 10 includes a state observation section 22, a determination data acquisition section 24, and a learning section 26. The state observation section 22 observes, as state variables S expressing the current state of an environment, circuit configuration data S1 indicating the circuit configuration of the FPGA device set with respect to the error occurrence state of the FPGA device, and FPGA error occurrence state data S2 indicating the error occurrence state of the FPGA device. The determination data acquisition section 24 acquires determination data D indicating the propriety determination results of the operating state of the FPGA device under the set circuit configuration of the FPGA device. Using the state variables S and the determination data D, the learning section 26 learns the circuit configuration data S1 and the FPGA error occurrence state data S2 in association with each other.

The state observation section 22 may be configured as, for example, one of the functions of the CPU of a computer or software for functioning the CPU of the computer. Among the state variables S observed by the state observation section 22, the circuit configuration data S1 may be acquired from, for example, report data relating to the circuit configuration of the FPGA device reported by a skilled circuit designer and given to the circuit configuration optimization apparatus 10, data relating to the circuit configuration of the FPGA device acquired from a system that reconfigures the FPGA device, or the like.

Figure 2:
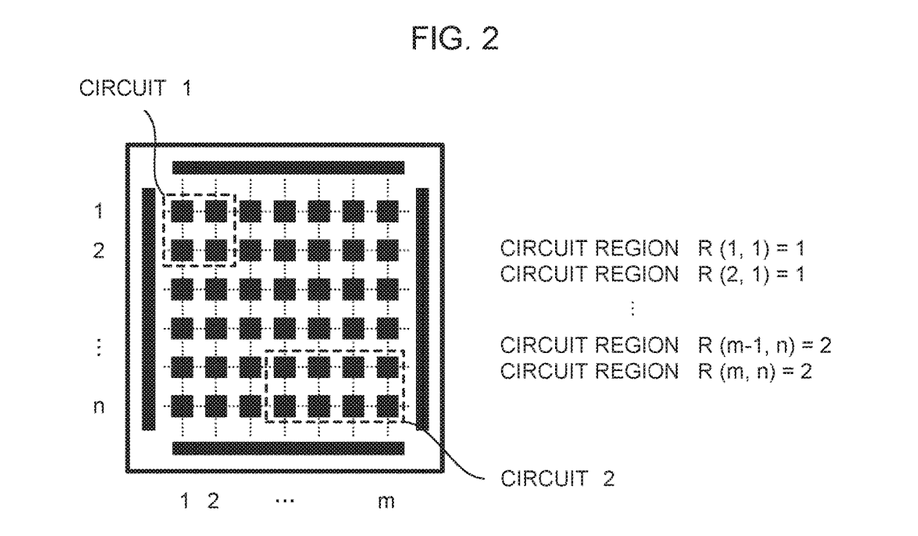
FIG. 2 is a diagram illustrating by an example circuit configuration data S1.

Examples of the circuit configuration data S1 may include logic circuits arranged at the respective positions of the FPGA device and the types of the respective logic circuits. In this case, the logic circuits arranged at the respective positions of the FPGA device may be expressed as follows. As shown in, for example, in FIG. 2, partial regions obtained by dividing a region on the FPGA device in an m×n matrix pattern are expressed as arrays, and the arrangement of the logic circuits as the elements of the respective arrays may be expressed by the identifiers of the logic circuits. In addition, as the types of the logic circuits, the types of the configuration methods of the logic circuits such as standard logic circuits, logic circuits with their area reduced (logic circuits in which an area is reduced instead of lowering the entire function to reduce a soft error ratio), multiplexing logic circuits (logic circuits in which a soft error ratio is reduced by multiplexing; the areas of the logic circuits increase), and logic circuits with an error correcting circuit (logic circuits in which a soft error ratio is reduced with the addition of an error correcting circuit such as an ECC; an operating speed reduces and a heating value and product power increases) may be expressed by identifiers.

In addition, as the FPGA error occurrence state data S2 among the state variables S, values detected by the error detection means (not shown) of the FPGA device may be, for example, used. Examples of the FPGA error occurrence state data S2 may include soft error occurrence frequencies at the respective positions of the FPGA device. In this case, for example, soft error occurrence history may be stored in the memory (not shown) of the circuit configuration optimization apparatus 10 for each of partial regions obtained by dividing a region on the FPGA device in an m×n matrix pattern, and a soft error occurrence frequency may be calculated for each of the partial regions of the FPGA device calculated based on the history information and used.

In the FPGA error occurrence state data S2, error occurrence frequencies at partial regions may be updated so long as the error detection means is allowed to specify the positions (partial regions) of the FPGA device at which a soft error has occurred. On the other hand, the error occurrence frequencies of all the partial regions in which a logic circuit having caused the occurrence of a soft error is arranged may be updated so long as the error detection means is allowed to specify any of the logic circuits on the FPGA device that has caused the occurrence of the soft error. History information for calculating an occurrence frequency of a soft error is saved (as history information on the soft error in a previous cycle) in a saving region on the memory every time the logic circuits on the FPGA device are reconfigured to record new history information.

The determination data acquisition section 24 may be configured as, for example, one of the functions of the CPU of a computer or software for functioning the CPU of the computer. As the determination data D acquired by the determination data acquisition section 24, error occurrence frequencies calculated based on the above history information newly recorded for each of the partial regions of the FPGA device after the circuits on the FPGA device are reconfigured (that is, the history information stored after the reconfiguration of the FPGA device) may be, for example, used. In addition, if necessary, heating values of the FPGA device actually measured by a thermal sensor or the like provided in an apparatus in which the FPGA device is installed, power consumption amounts of the FPGA device actually measured by a power consumption meter or the like, operating time of the FPGA device actually measured by a timer or the like, or the like may be used. The determination data D is an index expressing a result obtained when the FPGA device is operated under the state variables S.

As described above, while the machine learning device 20 of the circuit configuration optimization apparatus 10 advances machine learning, the acquisition of the FPGA error occurrence state data S2, the reconfiguration of the logic circuits on the FPGA device, and the acquisition of the determination data D by a sensor or the like are repeatedly performed in an environment.

The learning section 26 may be configured as, for example, one of the functions of the CPU of a computer or software for functioning the CPU of the computer. According to any learning algorithm collectively called machine learning, the learning section 26 learns the circuit configuration of the FPGA device. The learning section 26 may repeatedly perform learning based on a data set including the above state variables S and the determination data D with respect to the circuit configuration of the FPGA device. When a learning cycle is repeatedly performed for the reconfiguration of the FPGA device, the occurrence frequencies of a soft error calculated based on the above saved history information on the soft error in the previous cycle are used as the FPGA error occurrence state data S2 among the state variables S. As the occurrence frequency circuit configuration data S1, the circuit configuration of the FPGA device obtained until the previous learning cycle is used. As the determination data D, propriety determination results of the operating state of the FPGA device under the circuit configuration of the FPGA device are used.

By repeatedly performing such a learning cycle, the learning section 26 may automatically identify a feature suggesting the correlation between the error occurrence state of the FPGA device (FPGA error occurrence state data S2) and the circuit configuration of the FPGA device. Although the correlation between the FPGA error occurrence state data S2 and the circuit configuration of the FPGA device is substantially unknown at the start of a learning algorithm, the learning section 26 gradually identifies a feature indicating the correlation and interprets the correlation as learning is advanced.

When the correlation between the FPGA error occurrence state data S2 and the circuit configuration of the FPGA device is interpreted to a certain reliable extent, learning results repeatedly output by the learning section 26 may be used to select the action (that is, decision making) of determining the form of the circuit configuration of the FPGA device for a current state (that is, the error occurrence state of the FPGA device). That is, as a learning algorithm is advanced, the learning section 26 may gradually approximate the correlation between the error occurrence state of the FPGA device and the action of determining the form of the circuit configuration of the FPGA device for the error occurrence state to an optimum solution.

As described above, in the machine learning device 20 of the circuit configuration optimization apparatus 10, the learning section 26 learns the circuit configuration of the FPGA device according to a machine learning algorithm using the state variables S observed by the state observation section 22 and the determination data D acquired by the determination data acquisition section 24. The state variables S are composed of the circuit configuration data S1 and the FPGA error occurrence state data S2 hardly influenced by disturbance. In addition, the determination data D is uniquely calculated by the acquisition of the heating values of the FPGA device actually measured by a thermal sensor or the like provided in an apparatus in which the FPGA device is installed, power consumption amounts of the FPGA device actually measured by a power consumption meter or the like, operating time of the FPGA device actually measured by a timer or the like, the above error occurrence frequency for each of the partial regions of the FPGA device, or the like.

Accordingly, using learning results of the learning section 26, the machine learning device 20 of the circuit configuration optimization apparatus 10 may automatically and accurately calculate the circuit configuration of the FPGA device according to the error occurrence state of the FPGA device without relying on calculation or estimation.

Where it is possible to automatically calculate the circuit configuration of the FPGA device without relying on calculation or estimation, the appropriate circuit configuration of the FPGA device may be quickly determined only by understanding the error occurrence state of the FPGA device (FPGA error occurrence state data S2). Accordingly, the reconfiguration of the circuits of the FPGA device may be efficiently performed.

As a modified example of the machine learning device 20 of the circuit configuration optimization apparatus 10, the state observation section 22 may further observe FPGA operating state data S3 as the state variables S. The FPGA operating state data S3 includes heating values of the FPGA device actually measured by a thermal sensor or the like provided in an apparatus in which the FPGA device is installed, power consumption amounts of the FPGA device actually measured by a power consumption meter or the like, operating time of the FPGA device actually measured by a timer or the like, or the like. In this case, the circuit configuration of the FPGA device may be learned in association with the FPGA error occurrence state data S2 and the FPGA operating state data S3.

In the above modified example, the machine learning device 20 may learn the circuit configuration of the FPGA device in consideration of the heating values, the power consumption amounts, the operating speed, or the like of the FPGA device besides an error occurrence frequency for each of the partial regions of the FPGA device to reconfigure the circuits of the FPGA device. Thus, when a plurality of circuit configurations of the FPGA device that reduces an error occurrence frequency with respect to an error occurrence state is assumed in the error occurrence state, it becomes possible to preferentially select one of the circuit configurations of the FPGA device that realizes lower heating values, lower power consumption amounts, or faster operating speed.

As another modified example of the machine learning device 20 of the circuit configuration optimization apparatus 10, the learning section 26 may learn the circuit configuration of the FPGA device in each of apparatuses using the state variables S and the determination data D acquired for each of the plurality of apparatuses in which the FPGA device having the same logic circuits is installed. According to the configuration, it is possible to increase an amount of a data set including the state variables S and the determination data D acquired in a certain period of time. Therefore, the learning speed and the reliability of the circuit configuration of the FPGA device may be improved with a set of more various data as inputs.

Figure 3:
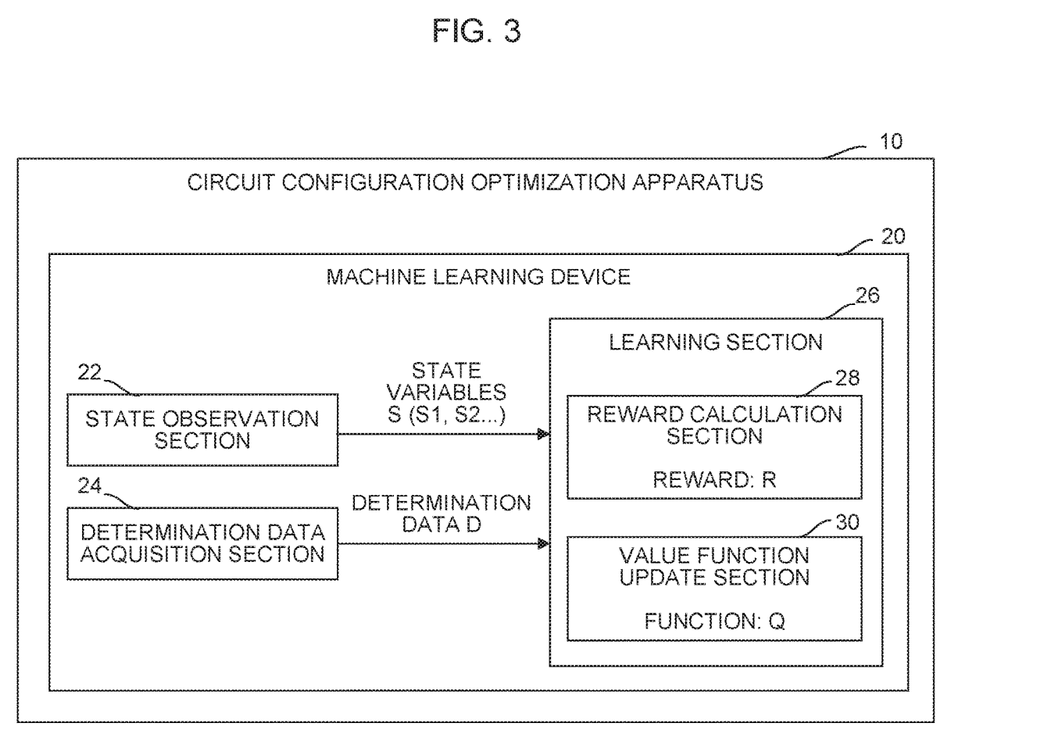
FIG. 3 is a schematic function block diagram showing an embodiment of the circuit configuration optimization apparatus.

In the machine learning device 20 having the above configuration, a learning algorithm performed by the learning section 26 is not particularly limited. For example, a learning algorithm known as machine learning may be employed. FIG. 3 shows, as an embodiment of the circuit configuration optimization apparatus 10 shown in FIG. 1, a configuration including the learning section 26 that performs reinforcement learning as an example of a learning algorithm.

The reinforcement learning is a method in which, while the current state (that is, an input) of an environment in which a learning target exists is observed, a prescribed action (that is, an output) is performed in the current state and the cycle of giving any reward to the action is repeatedly performed by trial and error to learn measures (the circuit configuration of the FPGA device in the machine learning device of the present application) to maximize the total of the rewards as an optimum solution.

In the machine learning device 20 of the circuit configuration optimization apparatus 10 shown in FIG. 3, the learning section 26 includes a reward calculation section 28 that calculates rewards R relating to propriety determination results (corresponding to the determination data D used in the next learning cycle) of the operating state of the FPGA device based on the state variables S, and includes a value function update section 30 that updates, using the rewards R, a function Q that expresses values of the circuit configuration of the FPGA device. The learning section 26 learns the circuit configuration of the FPGA device for the error occurrence state of the FPGA device in such a way that the value function update section 30 repeatedly updates the function Q.

An example of a reinforcement learning algorithm performed by the learning section 26 will be described. The algorithm in this example is known as Q-learning and expresses a method in which a state s of an action subject and an action a possibly taken by the action subject in the state s are assumed as independent variables and a function Q(s, a) expressing an action value when the action a is selected in the state s is learned. The selection of the action a by which the value function Q becomes maximum in the state s results in an optimum solution. By starting the Q-learning in a state in which the correlation between the state s and the action a is unknown and repeatedly performing the selection of various actions a by trial and error in any state s, the value function Q is repeatedly updated to be approximated to an optimum solution. Here, when an environment (that is, the state s) changes as the action a is selected in the state s, a reward (that is, weighting of the action a) r is obtained according to the change and the learning is directed to select an action a by which a higher reward r is obtained. Thus, the value function Q may be approximated to an optimum solution in a relatively short period of time.

Generally, the update formula of the value function Q may be expressed like the following formula (1). In formula (1), $s_t$ and $a_t$ express a state and an action at time t, respectively, and the state changes to $s_{t+1}$ with the action $a_t$. $r_{t+1}$ expresses a reward obtained when the state changes from $s_t$ to $s_{t+1}$. The term of max Q expresses Q in a case in which an action a by which the value function Q becomes maximum at time t+1 (which is assumed at time t) is performed. α and γ express a learning coefficient and a discount rate, respectively, and arbitrarily set to fall within 0<α≤1 and 0<γ≤1, respectively.

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

When the learning section 26 performs the Q-learning, the state variables S observed by the state observation section 22 and the determination data D acquired by the determination data acquisition section 24 correspond to the state s in the update formula (formula (1) above), the action of changing the circuit configuration of the FPGA device for a current state (that is, the error occurrence state of the FPGA device) corresponds to the action a in the update formula, and the rewards R calculated by the reward calculation section 28 correspond to the reward r in the update formula. Accordingly, the value function update section 30 repeatedly updates the function Q that expresses values of the circuit configuration of the FPGA device for a current state by the Q-learning using the rewards R.

(i) The rewards R calculated by the reward calculation section 28 may be positive, for example, if the operating state of the FPGA device is determined to be "appropriate" (for example, a case in which soft error occurrence frequencies of the respective partial regions of the FPGA device fall within an allowable range, a case in which heating values of the FPGA device fall within an allowable range, a case in which power consumption amounts of the FPGA device fall within an allowable range, a case in which operating speed of the FPGA device falls within an allowable range, or the like) when the FPGA device is operated based on the circuit configuration of the FPGA device after the circuit configuration of the FPGA device is determined.

(ii) On the other hand, the rewards R calculated by the reward calculation section 28 may be negative, for example, if the operating state of the FPGA device is determined to be "inappropriate" (for example, a case in which soft error occurrence frequencies of the respective partial regions of the FPGA device go beyond an allowable range, a case in which heating values of the FPGA device go beyond an allowable range, power consumption amounts of the FPGA device go beyond an allowable range, a case in which operating speed of the FPGA device goes beyond an allowable range, or the like) when the FPGA device is operated based on the circuit configuration of the FPGA device after the circuit configuration of the FPGA device is determined.

The absolute values of the positive and negative rewards R may be the same or different from each other. In addition, as determination conditions, a plurality of values included in the determination data D may be combined together to perform a determination. Moreover, in calculating rewards for soft error occurrence frequencies of the respective partial regions of the FPGA device, the reward calculation section 28 may determine proprieties using maximum values of the soft error occurrence frequencies of the respective partial regions or statistical values such as average values of the soft error occurrence frequencies of high-order prescribed partial regions.

In addition, propriety determination results of the operating state of the FPGA device are not limited to two levels of "appropriate" and "inappropriate" but may be set at a plurality of levels. As an example, when a maximum value of the allowable range of the heating value of the FPGA device is assumed as $T_{max}$, the reward R=5 is given if a heating amount T of the FPGA device falls within $0 \leq T < T_{max}/5$, the reward R=2 is given if the heating amount T of the FPGA device falls within $T_{max}/5 \leq T < T_{max}/2$, and the reward R=1 is given if the heating amount T of the FPGA device falls within $T_{max}/2 \leq T \leq T_{max}$. In addition, $T_{max}$ may be set to be relatively larger at the initial stage of the learning and set to decrease as the learning is advanced.

Note that there is a case that an error occurs even if the reconfiguration of the FPGA device is attempted based on a determined circuit configuration when the circuit configuration of the FPGA device is determined based on a result of the learning section 26 (the occurrence of the error in this case results from a condition in which an area configuring logic circuits is insufficient, a condition in which the installation of wiring is not allowed, or the like). In this case, the circuit configuration of the FPGA device for the same state is determined again, but the learning is advanced beforehand with a reward R calculated by the reward calculation section 28 assumed as a large negative reward R. Thus, the circuit configuration will not be selected in the same state in the next and subsequent cycles.

The value function update section 30 may have an action value table in which the state variables S, the determination data D, and the rewards R are organized in association with action values (for example, numeric values) expressed by the function Q. In this case, the action of updating the function Q with the value function update section 30 is equivalent to the action of updating the action value table with the value function update section 30. At the start of the Q-learning, the correlation between the current state of an environment and the circuit configuration of the FPGA device is unknown. Therefore, in the action value table, various kinds of the state variables S, the determination data D, and the rewards R are prepared in association with values (function Q) of randomly-set action values. Note that the reward calculation section 28 may immediately calculate the rewards R corresponding to the determination data D when the determination data D is known, and values of the calculated rewards R are written in the action value table.

When the Q-learning is advanced using the rewards R corresponding to propriety determination results of the operating state of the FPGA device, the learning is directed to select the action of obtaining higher rewards R. Then, values (function Q) of action values for an action performed in a current state are rewritten to update the action value table according to the state of an environment (that is, the state variables S and the determination data D) that changes as the selected action is performed in the current state. By repeatedly performing the update, values (function Q) of action values displayed in the action value table are rewritten to be larger as an action is more appropriate. Thus, the correlation between a current state (the error occurrence state of the FPGA device) in an unknown environment and a corresponding action (determining the circuit configuration of the FPGA device) becomes gradually obvious. That is, by the update of the action value table, the relationship between the error occurrence state of the FPGA device and the circuit configuration of the FPGA device is gradually approximated to an optimum solution.

Figure 4:
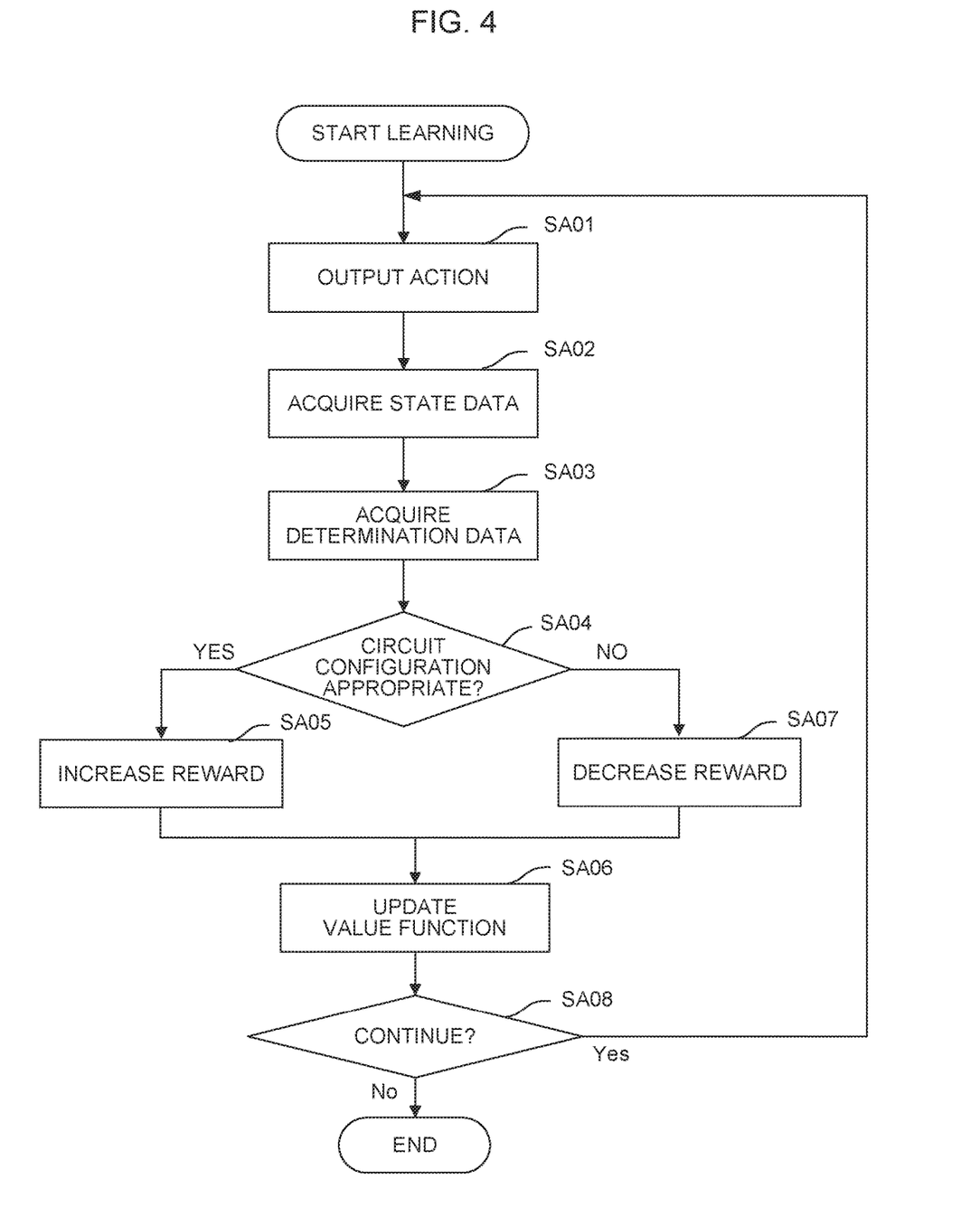
FIG. 4 is a schematic flowchart showing an embodiment of a machine learning method.

The flow of the above Q-learning (that is, an embodiment of a machine learning method) performed by the learning section 26 will be further described with reference to FIG. 4.

First, in step SA01, the value function update section 30 randomly selects, by referring to an action value table at that time, the circuit configuration of the FPGA device as an action performed in a current state indicated by the state variables S observed by the state observation section 22. Next, the value function update section 30 imports the state variable S in the current state observed by the state observation section 22 in step SA02, and imports the determination data D in the current state acquired by the determination data acquisition section 24 in step SA03. Then, in step SA04, the value function update section 30 determines if the circuit configuration of the FPGA device is appropriate based on the determination data D. If the circuit configuration is appropriate, the value function update section 30 applies a positive reward R calculated by the reward calculation section 28 to the update formula of the function Q in step SA05. Next, in step SA06, the value function update section 30 updates the action value table using the state variable S and the determination data D in the current state, the reward R, and a value (updated function Q) of an action value. If it is determined in step SA04 that the circuit configuration of the FPGA device is inappropriate, the value function update section 30 applies a negative reward R calculated by the reward calculation section 28 to the update formula of the function Q in step SA07. Then, in step SA06, the value function update section 30 updates the action value table using the state variable S and the determination data D in the current state, the reward R, and the value (updated function Q) of the action value.

The learning section 26 updates the action value table over again by repeatedly performing the processing of steps SA01 to SA07 and advances the learning of the circuit configuration of the FPGA device. Note that the processing of calculating the rewards R and the processing of updating the value function in steps SA04 to SA07 are performed for each of data contained in the determination data D.

Figure 5A:
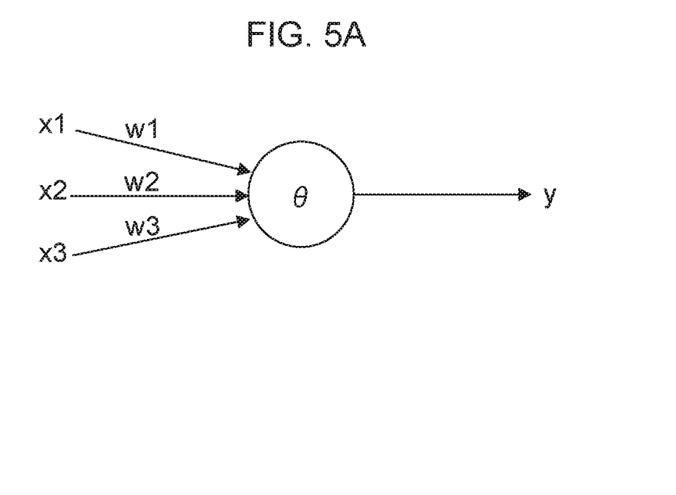
FIG. 5A is a diagram showing a neuron.
Figure 5B:
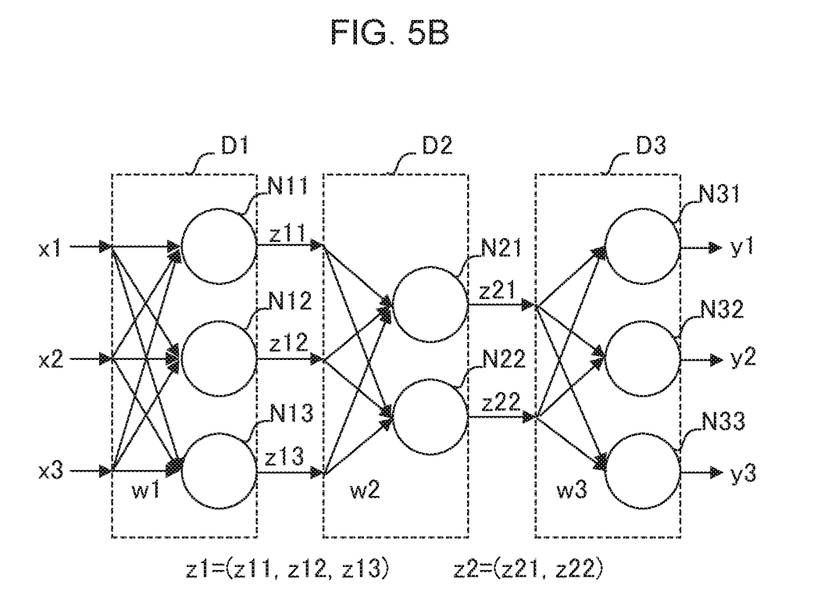
FIG. 5B is a diagram for describing a neural network.

In advancing the above reinforcement learning, a neural network may be used instead of, for example, the Q-learning. FIG. 5A schematically shows a neuron model. FIG. 5B schematically shows the model of a neural network having three layers in which the neurons shown in FIG. 5A are combined together. The neural network may be configured by, for example, a calculation unit, a storage unit, or the like following a neuron model.

The neuron shown in FIG. 5A outputs a result y with respect to a plurality of inputs x (here, inputs $x_1$ to $x_3$ as an example). The inputs $x_1$ to $x_3$ are multiplied by corresponding weights w ($w_1$ to $w_3$), respectively. Thus, the neuron outputs the result y expressed by the following formula (2). Note that in the following formula (2), an input x, a result y, and a weight w are all vectors. In addition, θ expresses a bias, and $f_k$ expresses an activation function.

$$y = f_k(\Sigma_{i=1}^n x_i w_i - \theta) \qquad (2)$$

In the neural network having the three layers shown in FIG. 5B, a plurality of inputs x (here, inputs x1 to x3 as an example) is input from the left side of the neural network, and results y (here, results y1 to y3 as an example) are output from the right side of the neural network. In the example shown in FIG. 5B, the inputs x1 to x3 are multiplied by corresponding weights (collectively expressed as w1) and input to three neurons N11 to N13, respectively.

In FIG. 5B, the respective outputs of the neurons N11 to N13 are collectively expressed as z1. The outputs z1 may be regarded as feature vectors obtained by extracting feature amounts of the input vectors. In the example shown in FIG. 5B, the respective feature vectors z1 are multiplied by corresponding weights (collectively indicated as w2) and input to two neurons N21 and N22, respectively. The feature vectors z1 express the features between the weights w1 and the weights w2.

In FIG. 5B, the respective outputs of neurons N21 and N22 are collectively expressed as z2. The outputs z2 may be regarded as feature vectors obtained by extracting feature amounts of the feature vectors z1. In the example shown in FIG. 5B, the respective feature vectors z2 are multiplied by corresponding weights (collectively indicated as w3) and input to three neurons N31 to N33, respectively. The feature vectors z2 express the features between the weights w2 and the weight w3. Finally, the neurons N31 to N33 output the results y1 to y3, respectively.

Note that it is possible to employ so-called deep learning in which a neural network forming three or more layers is used.

In the machine learning device 20 of the circuit configuration optimization apparatus 10, the learning section 26 calculates the state variables S and the determination data D as inputs x in a multilayer structure according to the above neural network to be capable of outputting the circuit configuration (result y) of the FPGA device. Note that the action mode of the neural network includes a learning mode and a value prediction mode. For example, it is possible to learn a weight W using a learning data set in the learning mode and determine an action value using the learned weight W in the value prediction mode. Note that detection, classification, deduction, or the like may be performed in the value prediction mode.

The configuration of the above circuit configuration optimization apparatus 10 may be described as a machine learning method (or software) performed by the CPU of a computer. The machine learning method is a method for learning the circuit configuration of a FPGA device. The machine learning method includes: (1) a step of observing, with the CPU of a computer, circuit configuration data S1 indicating the circuit configuration of the FPGA device, and FPGA error occurrence state data S2 indicating the error occurrence state of the FPGA device as state variables S expressing the current state of an environment in which the FPGA device is operated; (2) a step of acquiring determination data D indicating propriety determination results of the operating state of the FPGA device; and (3) a step of learning the circuit configuration of the FPGA device and FPGA error occurrence state data S2 in association with each other, using the state variables S and the determination data D.

Figure 6:
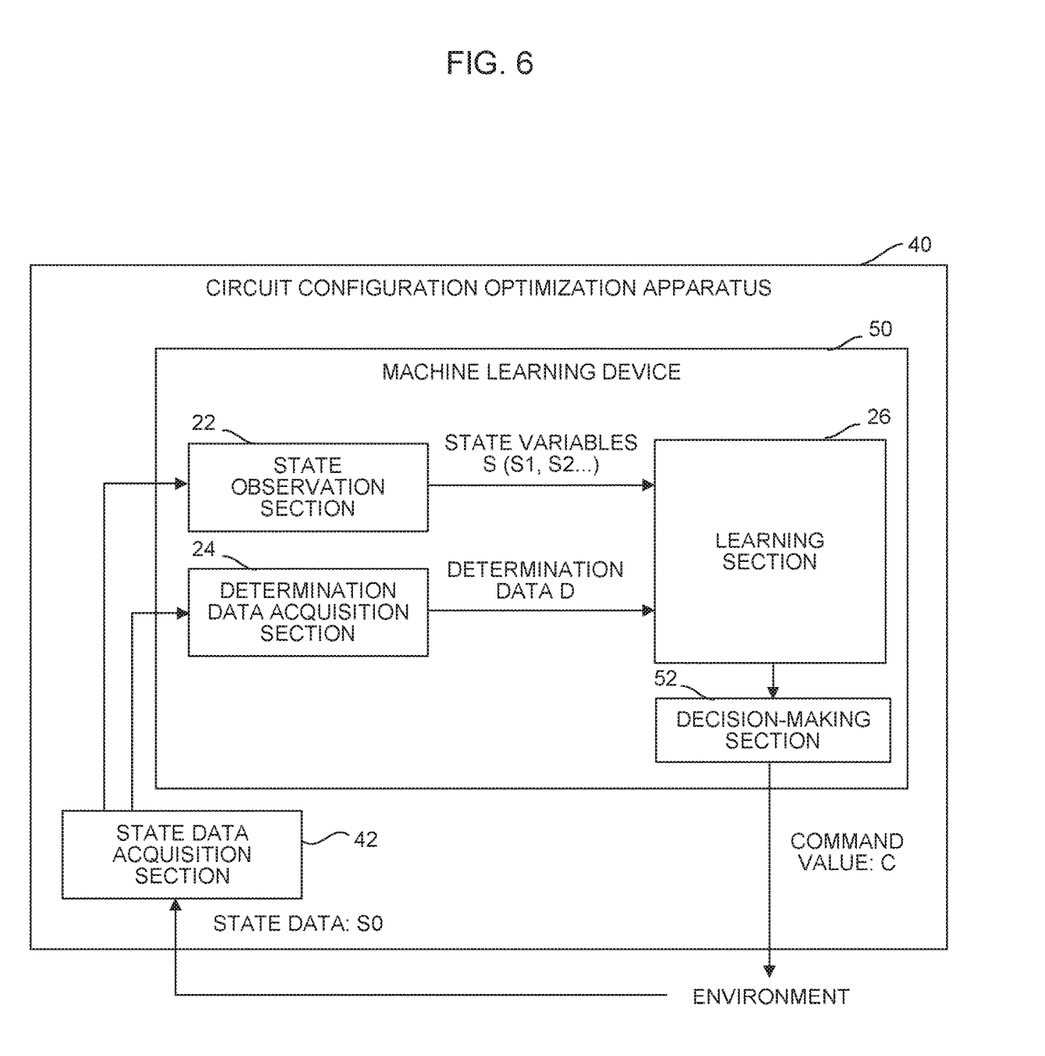
FIG. 6 is a schematic function block diagram of a circuit configuration optimization apparatus according to a second embodiment of the present invention.

FIG. 6 shows a circuit configuration optimization apparatus 40 according to a second embodiment. The circuit configuration optimization apparatus 40 includes a machine learning device 50 and a state data acquisition section 42. The state data acquisition section 42 acquires circuit configuration data S1 and FPGA error occurrence state data S2 of state variables S observed by a state observation section 22 as state data S0. The state data S0 acquired by the state data acquisition section 42 may also include FPGA operating state data S3. The state data acquisition section 42 may acquire the state data S0 from various sensors placed along the apparatus, the above error detection device, appropriate data inputs by a worker, or the like.

The machine learning device 50 of the circuit configuration optimization apparatus 40 includes, besides software (such as a learning algorithm) and hardware (such as the CPU of a computer) for spontaneously learning the circuit configuration of a FPGA device through machine learning, software (such as a calculation algorithm) and hardware (such as the CPU of a computer) for outputting the learned circuit configuration of the FPGA device as a command for a system (not shown) that reconfigures the circuit configuration of the FPGA device. The machine learning device 50 of the circuit configuration optimization apparatus 40 may be so configured that one common CPU performs all software such as a learning algorithm and a calculation algorithm.

A decision-making section 52 may be configured as, for example, one of the functions of the CPU of a computer or software for functioning the CPU of the computer. The decision-making section 52 generates and outputs a command value C for the reconfiguration of the circuits of the FPGA device based on the circuit configuration of the FPGA device for the error occurrence state of the FPGA device learned by the learning section 26. When the decision-making section 52 outputs the command value C relating to the reconfiguration of the circuits of the FPGA device to a system that reconfigures the circuit configuration of the FPGA device, the state (circuit configuration data S1) of an environment changes correspondingly.

The state observation section 22 observes, in a next learning cycle, state variables S including circuit configuration data S1 changed after the output of the command value C relating to the reconfiguration of the FPGA device to an environment by the decision-making section 52. The learning section 26 updates, for example, a value function Q (that is, an action value table) using the changed state variables S to learn the circuit configuration of the FPGA device. Based on the learned circuit configuration of the FPGA device, the decision-making section 52 outputs the command value C relating to the reconfiguration of the circuits of the FPGA device to the system that reconfigures the circuit configuration of the FPGA device according to state variables S. By repeatedly performing the cycle, the machine learning device 50 advances the learning of the circuit configuration of the FPGA device and gradually improves the reliability of the circuit configuration of the FPGA device determined by the machine learning device 50 itself.

The machine learning device 50 of the circuit configuration optimization apparatus 40 having the above configuration produces the same effect as that of the above machine learning device 20 shown in FIGS. 1 and 3. Particularly, the machine learning device 50 shown in FIG. 6 may change the state of an environment with the output of the decision-making section 52. On the other hand, the machine learning device 20 may ask a function corresponding to a decision-making section for reflecting learning results of the learning section 26 on an environment for an external apparatus.

Figure 7:
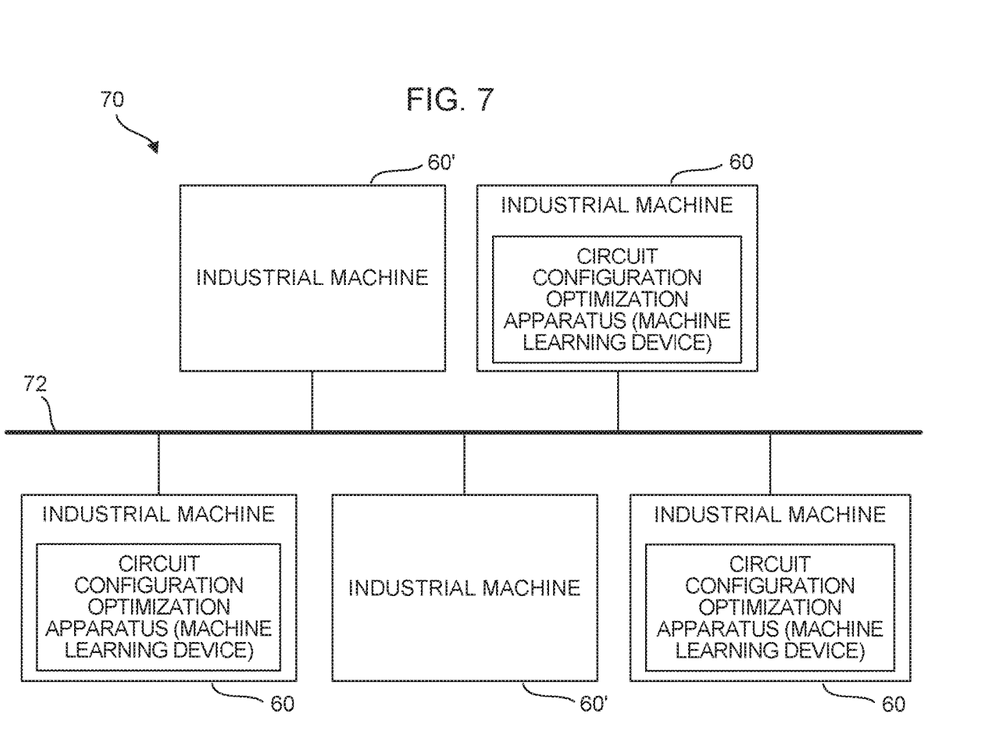
FIG. 7 is a schematic function block diagram showing an embodiment of a system in which circuit configuration optimization apparatuses are incorporated.

FIG. 7 shows a system 70 including industrial machines 60 according to an embodiment. The system 70 includes a plurality of industrial machines 60 and 60' having at least the same machine configuration and a wired/wireless network 72 that connects the industrial machines 60 and 60' to each other. At least one of the plurality of industrial machines 60 and 60' is configured as an industrial machine 60 including the above circuit configuration optimization apparatus 40. In addition, the system 70 may have industrial machines 60' that do not include the circuit configuration optimization apparatus 40. The industrial machines 60 and 60' have a FPGA device in which logic circuits for the same purpose are configured, and have a configuration for reconfiguring the circuits of the FPGA device.

In the system 70 having the above configuration, the industrial machines 60 including the circuit configuration optimization apparatus 40 among the plurality of industrial machines 60 and 60' may automatically and accurately calculate the circuit configuration of the FPGA device according to the error occurrence state of the FPGA device without relying on calculation or estimation using learning results of the learning section 26. In addition, the circuit configuration optimization apparatus 40 of at least one of the industrial machines 60 may learn the circuit configuration of the FPGA device common to all the industrial machines 60 and 60' based on state variables S and determination data D obtained for each of the other plurality of industrial machines 60 and 60' so that the learning results are shared between all the industrial machines 60 and 60'. Accordingly, the system 70 makes it possible to improve the speed and the reliability of learning the circuit configuration of the FPGA device with a broader range of data sets (including state variables S and determination data D) as inputs.

Figure 8:
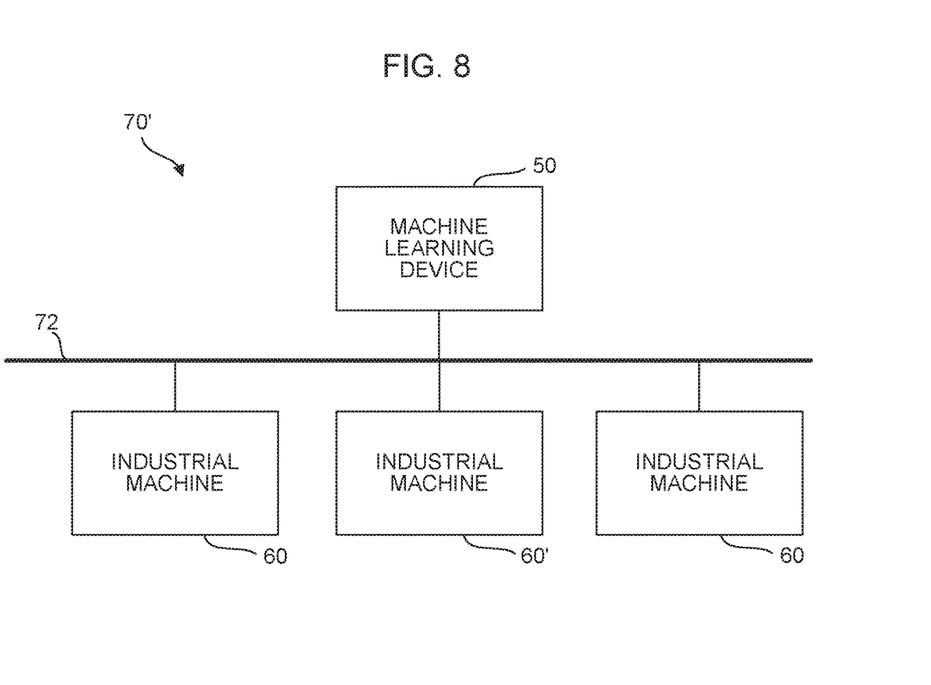
FIG. 8 is a schematic function block diagram showing another embodiment of a system in which a circuit configuration optimization device is incorporated.

FIG. 8 shows a system 70' including industrial machines 60' according to another embodiment. The system 70' includes the machine learning device 50 (or 20), the plurality of industrial machines 60' having the same machine configuration, and a wired/wireless network 72 that connects the industrial machines 60' and the machine learning device 50 (or 20) to each other.

In the system 70' having the above configuration, the machine learning device 50 (or 20) may learn the circuit configuration of the FPGA device according to the error occurrence state of the FPGA device common to all the industrial machines 60' based on state variables S and determination data D obtained for each of the plurality of industrial machines 60', and automatically and accurately calculate the circuit configuration of the FPGA device according to the error occurrence state of the FPGA device without relying on calculation or estimation using the learning results.

In the system 70', the machine learning device 50 (or 20) may have a configuration existing in a cloud server or the like provided in the network 72. According to the configuration, a desired number of the industrial machines 60' may be connected to the machine learning device 50 (or 20) where necessary regardless of the existing locations and the times of the plurality of industrial machines 60'.

Workers engaging in the systems 70 and 70' may perform a determination as to whether the achievement degree of learning the circuit configuration of the FPGA device (that is, the reliability of the circuit configuration of the FPGA device) with the machine learning device 50 (or 20) has reached a required level at an appropriate timing after the start of learning by the machine learning device 50 (or 20).

The embodiments of the present invention are described above. However, the present invention is not limited to the examples of the above embodiments and may be carried out in various modes with the addition of appropriate modifications.

For example, a learning algorithm performed by the machine learning devices 20 and 50, a calculation algorithm performed by the machine learning device 50, and a control algorithm performed by the circuit configuration optimization apparatuses 10 and 40 are not limited to the above algorithms, but various algorithms may be employed.

In addition, the above embodiments describe an example in which the machine learning devices 20 and 50 perform machine learning online on the circuit configuration optimization apparatuses 10 and 40. However, the machine learning devices 20 and 50 may record the state data S and the determination data D as log data during the operation of the FPGA device, collect the recorded log data, and perform machine learning based on the state data S and the determination data D acquired from the collected log data.

The invention claimed is:

1. A circuit configuration optimization apparatus that optimizes a circuit configuration and an arrangement of a field programmable gate array (FPGA) device, the circuit configuration optimization apparatus comprising:
   a machine learning device that learns the circuit configuration of the FPGA device, wherein the machine learning device includes
   a state observation section that observes, as state variables that express a current state of an environment, circuit configuration data of the FPGA device indicating the circuit configuration of the FPGA device, and FPGA error occurrence state data indicating an error occurrence state of the FPGA device which includes soft error occurrence frequencies at the respective positions of the EPGA device,
   a determination data acquisition section that acquires determination data indicating propriety determination results of an operating state of the FPGA device, and
   a learning section that learns the circuit configuration of the FPGA device in association with the FPGA error occurrence state data, using the state variables and the determination data.

2. The circuit configuration optimization apparatus according to claim 1, wherein
   the state observation section further observes FPGA device operating state data containing, as the state variable, at least any of a heating value, power consumption, and operating speed of the FPGA device, and
   the learning section learns the circuit configuration of the FPGA device in association with both the FPGA error occurrence state data and the FPGA device operating state data.

3. The circuit configuration optimization apparatus according to claim 1, wherein
   the learning section includes
   a reward calculation section that calculates rewards relating to the propriety determination results, and
   a value function update section that updates, using the rewards, a function that expresses values of the circuit configuration of the FPGA device for the error occurrence state of the FPGA device.

4. The circuit configuration optimization apparatus according to claim 1, wherein
   the learning section calculates the state variables and the determination data in a multilayer neural network.

5. The circuit configuration optimization apparatus according to claim 1, further comprising a decision-making section that outputs a command value based on the circuit configuration of the FPGA device, according to learning results of the learning section.

6. The circuit configuration optimization apparatus according to claim 1, wherein
   the learning section learns the circuit configuration of the FPGA device in each of a plurality of industrial machines, using the state variables and the determination data obtained for each of the plurality of industrial machines.

7. The circuit configuration optimization apparatus according to claim 1, wherein
the machine learning device exists in a cloud server.

8. A machine learning device that learns a circuit configuration of a FPGA device, the machine learning device comprising:
- a state observation section that observes, as state variables that express a current state of an environment, circuit configuration data of the FPGA device indicating the circuit configuration of the FPGA device, and FPGA error occurrence state data indicating an error occurrence state of the FPGA device which includes soft error occurrence frequencies at the respective positions of the EPGA device;
- a determination data acquisition section that acquires determination data indicating propriety determination results of an operating state of the FPGA device; and
- a learning section that learns the circuit configuration of the FPGA device in association with the FPGA error occurrence state data, using the state variables and the determination data.

* * * * *